United States Patent
Sui et al.

(10) Patent No.: US 11,286,410 B2
(45) Date of Patent: *Mar. 29, 2022

(54) ORGANIC-INORGANIC HYBRID POLYMER BASED FLUIDS

(71) Applicant: M-I L.L.C., Houston, TX (US)

(72) Inventors: Changping Sui, The Woodlands, TX (US); Balakrishnan Panamarathupalayam, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 14/979,975

(22) Filed: Dec. 28, 2015

(65) Prior Publication Data

US 2016/0177163 A1 Jun. 23, 2016

Related U.S. Application Data

(60) Provisional application No. 62/095,454, filed on Dec. 22, 2014.

(51) Int. Cl.
*C09K 8/035* (2006.01)
*C09K 8/512* (2006.01)
*C09K 8/508* (2006.01)

(52) U.S. Cl.
CPC ............ *C09K 8/035* (2013.01); *C09K 8/5083* (2013.01); *C09K 8/512* (2013.01)

(58) Field of Classification Search
CPC ....... C09K 8/035; C09K 8/512; C09K 8/5083
See application file for complete search history.

(56) References Cited

U.S. PATENT DOCUMENTS

| 4,316,807 | A | * | 2/1982 | McDaniel | C09K 8/16 507/127 |
| 9,714,376 | B2 | * | 7/2017 | Yang | C09K 8/035 |
| 2006/0116296 | A1 | * | 6/2006 | Kippie | C09K 8/22 507/244 |
| 2011/0256085 | A1 | * | 10/2011 | Talingting Pabalan | A61K 8/042 424/70.13 |
| 2011/0257051 | A1 | | 10/2011 | Welton et al. | |
| 2012/0214714 | A1 | * | 8/2012 | Whitwell | C09K 8/68 507/222 |
| 2013/0129658 | A1 | | 5/2013 | Nguyen-Kim et al. | |
| 2014/0357535 | A1 | | 12/2014 | Tang et al. | |
| 2015/0000985 | A1 | * | 1/2015 | Zhou | C09K 8/512 175/65 |
| 2015/0005206 | A1 | * | 1/2015 | Zhou | C09K 8/882 507/225 |
| 2016/0272868 | A1 | * | 9/2016 | Wang | C09K 8/512 |

FOREIGN PATENT DOCUMENTS

WO WO-2013040178 A1 * 3/2013 ............ C09K 8/035
WO 2015/038750 A1 3/2015

OTHER PUBLICATIONS

Combined Search Report and Examination Report for the equivalent UK patent application 1522250.8 dated Sep. 19, 2016.

* cited by examiner

*Primary Examiner* — Karuna P Reddy
(74) *Attorney, Agent, or Firm* — Garry Brown, Jr.

(57) ABSTRACT

A brine viscosifier includes at least one monomer and triethoxyvinylsilane (TEVS) to provide crosslinking among the at least one monomer. A method includes admixing a composition comprising a brine, a thermal stabilizer, a pH buffer, and a polymer. The polymer may include a monomer, an organic crosslinker, an inorganic crosslinker; and an initiator.

5 Claims, No Drawings

ORGANIC-INORGANIC HYBRID POLYMER BASED FLUIDS

This application claims the benefit of U.S. Provisional Application No. 62/095,454 filed on Dec. 22, 2014, incorporated by reference herein in its entirety.

BACKGROUND

Annular fluids, also known as packer fluids or insulating packer fluids, are liquids which are pumped into annular openings such as, for example, (1) between a wellbore wall and a casing, (2) between adjacent, concentric strings of pipe extending into a wellbore, or (3) into the bore of a cased wellbore. In the completion of oil and gas wells, it is currently the practice to place aqueous or non-aqueous hydrocarbon based fluids, such as packer fluids, into a casing annulus above a packer, specifically where the packer has been set to isolate production fluid from the casing annulus. Packer fluids, introduced into the casing annulus around a production pipe, fill the annular column to surface. Packer fluids are utilized for various reasons, such as, to provide both pressure stability and thermal protection to the casing annulus of production oil and gas wells as well as in injection wells, to provide hydrostatic pressure to lower pressure across the sealing element and to equalize pressure relative to the formation, to lower differential pressure on the wellbore and/or casing to prevent collapse, and to protect metals and elastomers from corrosion. Packer fluids may further be used to control heat loss, both conductive and convective heat losses. Thus, insulating packer fluids may be utilized in oil or gas well construction operations conducted in low temperature venues of the world, for example, those areas having permafrost.

Heavy oil production is an operation which often can benefit from the use of an insulating packer fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in stimulation using hot-water or steam (huff-n-puff) or in hot-water- or steam-flooding.

In addition to steam injection processes and operations which require production through a permafrost layer, subsea fields, such as in deep water, 1,500 to more than 6,000 feet deep, require specially designed systems, which may utilize an insulating packer fluid. For example, a subsea oil reservoir temperature may be between about 120° F. and 250° F., while the temperature of the water through which the oil may be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in a reduction or even catastrophic failure of the production operation.

Thus, it is desirable for compositions, such as packer fluids, for example, exhibiting good yield stress and long-term stability in high temperature environments.

SUMMARY

In one aspect, embodiments of the present disclosure provides a brine viscosifier including at least one monomer and triethoxyvinylsilane (TEVS) to provide crosslinking among the at least one monomer.

In another aspect, embodiments of the present disclosure provide a method including admixing a composition comprising a brine, a thermal stabilizer, a pH buffer, and a polymer. The polymer may include a monomer, an organic crosslinker, an inorganic crosslinker; and an initiator.

This summary is provided to introduce a selection of concepts that are further described below in the detailed description. This summary is not intended to identify features of the claimed subject matter, nor is it intended to be used as an aid in limiting the scope of the claimed subject matter. Other aspects of the present disclosure will be apparent from the following description and the appended claims.

DETAILED DESCRIPTION

Generally, the present disclosure relates to thermally stable organic-inorganic hybrid (swellable) copolymers synthesized for oil field applications. More particularly, the present disclosure relates to the compositions comprising both organic and inorganic crosslinkers. The highly cross-linked nano-scale polymeric particles were obtained through crosslinking between monomers by organic crosslinker during polymerization while the inorganic crosslinker maintains inertia with absence of water and controlling the neutral reacting condition. The inorganic crosslinker incorporated into polymeric particles during polymerization crosslinks the copolymer particles through its hydrolysis and afterward condensation at the presence of water and temperature when preparing the final water-base fluids. The intra—and inter-crosslinking network from the organic and inorganic crosslinker provides the water-base fluid with excellent low shear viscosity/yield stress. One such use of copolymers and/or polymers discussed herein is as an insulating packer fluid, which may be emplaced within an annulus to prevent heat loss. A majority of annular heat loss is due to convection and conduction. Heat loss due to thermal conductivity may be controlled by proper selection of fluids, while heat loss due to convection can be arrested or substantially diminished by increasing the low shear viscosity/yield stress of the selected fluid.

In certain aspects, disclosed embodiments relate to polymers and/or copolymers, used as insulating packer fluids, drilling fluids, or the like, containing monomers crosslinked by organic-inorganic crosslinkers including, but not limited to triethoxyvinylsilane (TEVS). Packer fluids according to embodiments disclosed herein may have relatively high densities, and may be adapted to survive in high temperature and/or high pressure wells. Further, insulating packer fluids in accordance with disclosed embodiments may possess low thermal conductivity, increased viscosity, and high stability under elevated temperatures.

Monomers

Depending on the application, the swellable polymer and/or copolymer may be composed of monomers, including nonionioc monomers, that may comprise a vinyl amide group. By way of example, monomers herein may include 2-acrylamido-2-methylpropanesulfonate also known as 2-acrylamido-2-methylpropane sulfonic acid (AMPS), acrylamide (AM), methacrylamide, N,N dimethyl acrylamide (DMAM), N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, poly(2-ethyl-2-oxazoline), $C_2$-$C_{12}$ olefins, ethylene, propylene, butene, butadiene, vinyl aromatics, styrene, alkylstyrene, acrylic acid, methacrylic acid, vinyl alcohol, partially hydrolyzed acrylamide or methacrylamide, and derivatives or mixtures thereof. In yet other embodiments, swellable polymers and/or copolymers may include polyalkylene amines and polyethers such as polyethylene oxide and polypropylene oxide.

An example of a monomer, acrylamide (AM), in amounts of from about 5 wt % to 50 wt %, for example, may be represented by the formula $C_3H_5NO$ (MW=71.08; ρ=1.13) and have the structural formula, for example, as shown below:

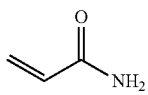

AM may also be present in amounts from about 5% to 20% wt % of the total composition (e.g., fluid, pill, etc.).

In other embodiments, the monomer can also be vinyl pyrrolidone (VP), N-methylacrylamide, N-isopropyl acryl amide, N-butylacrylamide, N,N-dimethylacrylamide, hydroxymethylacrylamide, N-hydroxymethylacrylamide, and other N-alkylacrylamides. Water-soluble salt forms of the carboxylic acids are also within purview of the present disclosure.

In yet other embodiments, a further example of a monomer, 2-acrylamido-2-methylpropanesulfonate also known as 2-acrylamido-2-methylpropane sulfonic acid (AMPS) or 3-allyloxyhydroxypropanesulfonate (AHPS), in amounts of from about 5 wt % to 50 wt %, may be represented by the formula $C_7H_{13}NO_4S$ (MW=207.25; ρ=1.1) and have the structural formula, for example, as shown below:

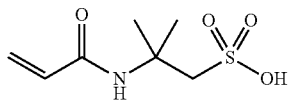

AMPS may provide enhanced thermal stability, as compared to AM, and may provide salinity tolerance for the resulting polymers.

In some embodiments, another monomer, N-vinylpyrrolidone (VP), in amounts of from about 1 wt % to 60 wt %, may be represented by the formula $C_6H_9NO$ (MW=111.14; ρ=1.043) and have the structural formula, for example, as shown below:

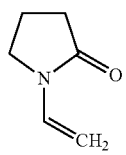

VP may be replaced by N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, in other embodiments.

The polymeric and/or copolymeric particles may be prepared from the aforementioned monomers by methods known in the art, including invert emulsion polymerization, and the like. Particle suspension may be prepared by mixing particles with suspension fluids, or if present in an inverse emulsion addition additives such as surfactants, for example.

Inorganic Crosslinker

Polymers and/or copolymers herein may comprise an inorganic crosslinker such as, for example, triethoxyvinylsilane (TEVS). TEVS or trimethoxyvinylsilane, as another example inorganic crosslinker, may be in amounts from about 1 wt % to 15 wt %, for example, which forms an inorganic phase in the packer fluid and may act as an inorganic gelling agent in a water based fluid for use in oilfield applications, and/or in an insulating packer fluid for completions, viscosifier, and fluid additive for drilling. TEVS may provide a gelled structure, similar that of xanthan, when dispersing the swellable tetrapolymer into water or brine, for example. Hydrolysis of TEVS produces Si—OH groups and polycondensation of —OH groups on the different swellable polymer particles generating networks among the polymer particles to provide the gelling structure. TEVS may also provide thermal stability to an aqueous fluid, such as in an insulating packer fluid, for the oilfield. Likewise, the presence of TEVS in the copolymer may increase the thermal stability of the polymer. In embodiments, TEVS may be represented by the formula $H_2C=CHSi(OC_2H_5)_3$ (MW=190.31; ρ=0.903) and have the structural formula, for example, as shown below:

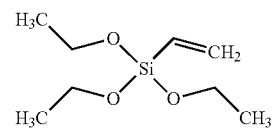

The present disclosure provides the combination of TEVS with a water-soluble polymer as utilized in an oilfield application. It is further contemplated that metals other than Si may be utilized in structures analogous to TEVS to serve as a inorganic crosslinker.

Disclosed herein, polymeric and/or co-polymeric particles made from monomers are crosslinked with stable inorganic crosslinkers (e.g., TEVS), allowing swelling in situ. As such, the swelled polymers and/or copolymers contain exposed hydrophobic groups which associate with one another and form a swelled hydrophobically associative polymer having inter- and intra-molecular junctions to promote increased viscosity relative to comparable polymers at the same concentration in a fluid. Polymers and/or copolymers herein may have use in enhanced oil recovery possessing hydrophilic properties while having hydrophobic groups attached.

Organic Crosslinker

Polymers and/or copolymers in accordance with embodiments disclosed herein may include one or more organic crosslinkers which include, for example, pentaerythritol allyl ether (PAE), in amounts from about 0.5 mol % to 1.5 mol %, for example, N,N'-ethylene-bisacrylamide, and/or N,N'-methylene-bisacrylamide. In embodiments, PAE may be represented by the formula $C_{17}H_{28}O_4$ and have the structural formula, for example, as shown below:

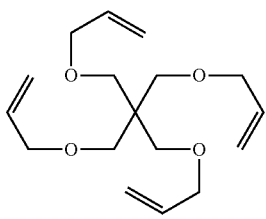 [SMILES: C=CCOCC(COCC=C)(COCC=C)COCC=C]

The structure of PAE provides 3-4 unsaturated vinyl groups to provide organic crosslinking network among the polymeric particles. PAE may be characterized by relatively low NaCl tolerance.

Initiator

Polymers and/or copolymers in accordance with embodiments disclosed herein may include one or more initiators which include a nitrile functional group. Examples of possible initiators may include, but are not limited to, 2,2'-azobis(2-methylpropionitrile) or azobisisobutyronitrile (AIBN) in amounts from about 0.05 mol % to 0.2 mol %, for example. Other initiators include, but are not limited to, 2,2'-azobis(isobutyramidine hydrochloride), 2,2'-azobis[2-(2-imidoazolin-2-yl)propane]dihydrochloride, 1,1'-azobis(cyclohexanecarbonitrile), 2,2'-azobis(2-methylpropionamidine)dihydrochloride, 4,4'-azobis(4-cyanovaleric acid), 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)-3,3,5-trimethylcyclohexane, 1,1-bis(tert-butylperoxy) cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne, 2-butanone peroxide, and/or cumene hydroperoxide.

An initiator may initiate polymerization by generating a free radical at a temperature of decomposition of the polymer, thereby providing bonding between the free radical and monomer. In embodiments, 2,2'-azobis(2-methylpropionitrile) or AIBN may be represented by the formula $C_8H_{12}N_4$ and have the structural formula, for example, as shown below:

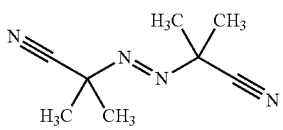

Procedure of Polymerization

The following procedure was followed to prepare an organic-inorganic hybrid copolymer in tert-butyl alcohol (TBA). A three-neck flask, equipped with a condenser and mechanical stirrer, was filed with TBA and AMPS. To neutralize the AMPS, equivalent and 5% more mole of ammonia in ammonium hydroxide solution (28~30% $NH_3$ basis) was added to the previously mentioned mixture. The mixture was heated to 140° F. with agitation and kept at this temperature for 30 min or until AMPS was completely dissolved in the solvent. The remaining monomers AM, VP, TEVS and crosslinker PAE were added to the mixture. The mixture was purged with $N_2$ for 30 min. A solution of AIBN was added to the reaction system and the reaction was kept at this temperature under $N_2$ and stirred for at least 6 hours. Table 15 shows typical formulas of terpolymer or tetrapolymer with various ratios of monomers and crosslinker.

EXAMPLE 1

A three-neck flask (250 ml), equipped with a condenser and mechanical stirrer, was filed with TBA (115 ml), AMPS (5 g) and ammonium hydroxide (1.65 ml) (28~30% $NH_3$ basis). The mixture was heated to 140° F. with agitation and kept at this temperature for 30 min or until AMPS was completely dissolved in the solvent. The remaining monomers AM (3.5 g), VP (1.0 g), TEVS (0.5 g) and crosslinker PAE (0.15 g) were added to the mixture. The mixture was purged with $N_2$ for 30 min. Then a solution of AIBN (0.033 g in 5 ml TBA) was added to the reaction system and the reaction was kept at this temperature under $N_2$ and stirred for at least 6 hours. A slurry of polymeric particles dispersing in TBA solvent was obtained.

EXAMPLE 2

The same procedure as in Example 1 was utilized, except that 0.30 g of PAE was added to the reaction system.

EXAMPLE 3

The same procedure as in Example 1 was utilized, except that 4.0 g of AMPS and 1.9 ml ammonium hydroxide solution was added to the reaction system and no VP was added.

EXAMPLE 4

The same procedure as in Example 1 was utilized, except that 3 g of AM, 2.0 g of VP, 0.125 g of PAE, 4.5 g of AMPS and 2.2 ml ammonium hydroxide solution were added to the reaction system.

EXAMPLE 5

The same procedure as in Example 1 was utilized, and the same monomer composition as in Example 4, except that 0.25 g of PAE was added to the reaction system.

EXAMPLE 6

The same procedure as in Example 1 was utilized, and the same monomer composition as in Example 5 was used, except that 0.15 g of VP and 1.0 G TEVS were added to the reaction system.

TABLE 1

Formula of terpolymer and tetrapolymers

| Component | #1 | #2 | #3 | #4 | #5 | #6 |
|---|---|---|---|---|---|---|
| AM (g) | 5.0 | 5.0 | 5.0 | 3.0 | 3.0 | 3.0 |
| AMPS (g) | 3.5 | 3.5 | 4.0 | 4.5 | 4.5 | 4.5 |
| VP (g) | 1.0 | 1.0 | 1.0 | 2.0 | 2.0 | 1.5 |
| TEVS (g) | 0.5 | 0.5 | 0 | 0.5 | 0.5 | 1.0 |
| PAE (mol %) | 0.5 | 1.0 | 0.5 | 0.5 | 1.0 | 1.0 |

Six water base SafeTherms named STH #1 through STH #6 were prepared by dispersing the corresponding copolymers listed in Table 1 in 12.0 ppg NaBr brine. The formulation of the fluids is listed below.

| Formulation of SafeTherms: | |
|---|---|
| copolymer | 8 ppb |
| ECF 2597 | 0.1 bbl |
| 12 ppg NaBr | 0.9 bbl |
| Na$_2$CO$_3$ | 5 ppb |
| NaHCO$_3$ | 10 ppb | where ECF 2597 is a thermal stabilizer containing 20 v % of triethanolamine and 80 v % of ethylene glycol and the combination of 5 ppb Na$_2$CO$_3$ and 10 ppb NAHCO3 is a pH buffer. The fluids were formulated using the formula above with the except STH #4, which does not have pH buffer. It was observed that the freshly made fluids did not exhibit a gelled structure. The gelled structure was developed after either hot rolling at 180° F. for 2~4 hours or setting the fluids overnight at room temperature. STH #1 through #4 were hot rolled at 180° F. for 2~4 and STH #5 and STH #6 were set at room temperature overnight before taking rheological measurements.

The SafeTherms were put in an oven at either 250° F. or 300° F. for static aging. The aging results were represented in Tables 2-4. Table 2 listed the rheology of samples before static aging. As seen in table 2, the SafeTherms exhibited positive low shear rheology and yield stress with the except of STH #3, which is a terpolymer without TEVS compared to the remaining tetrapolymers. Visually, STH #3 does not show a gelled structure after 5 hours of hot rolling. This implies that TEVS is the component providing the gelled structure and resulting in good low end rheology of the fluid. Tables 3 and 4 listed 1 week and 1 month static aging data, respectively. Compared to the data for unaged samples listed in Table 2, the rheology data for the samples after 1 week aging increased with the exception of STH #4 as seen in Table 3. The increase in rheology may be caused by the further yield of copolymer at a particular temperature or by the further gelling reaction between TEVS and different polymer particles. The slight decrease of rheology of STH #4 is due to the absence of pH buffer in the fluid. Comparing the rheological profiles between STH #1 and STH #2 for both an unaged sample and a one week aged sample, it can be concluded that the double organic crosslinker of STH #2 against STH #1 increases the rheology of the fluid, particularly for the low shear rheology. It may not be comparable between STH #4 and STH #5 due to the different formulations of those two fluids, particularly since STH #4 does not contain pH buffer.

TABLE 2

Rheology of unaged samples

| Fann 35 | STH#1 | STH#2 | STH#3 | STH#4 | STH#5 | STH#6 |
|---|---|---|---|---|---|---|
| 600 RPM | 265 | 340 | 137 | 250 | 188 | 215 |
| 300 RPM | 195 | 255 | 88 | 175 | 139 | 153 |
| 200 RPM | 165 | 215 | 68 | 140 | 116 | 124 |
| 100 RPM | 120 | 165 | 44 | 105 | 85 | 86 |
| 6 RPM | 50 | 85 | 9 | 45 | 31 | 32 |
| 3 RPM | 45 | 80 | 7 | 40 | 28 | 27 |
| PV | 70 | 85 | 49 | 75 | 49 | 62 |
| YP | 125 | 170 | 39 | 100 | 90 | 91 |
| $\tau_0$ | 28.96 | 65.11 | 2.6 | 33.21 | 12.61 | 15.79 |

TABLE 3

Rheology of samples after static aging at 250° F. for 1 week

| Fann 35 | STH#1 | STH#2 | STH#4 | STH#5 | STH#6 |
|---|---|---|---|---|---|
| 600 RPM | 465 | 450 | 233 | 271 | 340 |
| 300 RPM | 315 | 330 | 163 | 203 | 250 |
| 200 RPM | 260 | 275 | 130 | 168 | 210 |
| 100 RPM | 180 | 210 | 89 | 127 | 150 |
| 6 RPM | 60 | 90 | 31 | 46 | 60 |
| 3 RPM | 55 | 85 | 27 | 41 | 55 |
| PV | 150 | 120 | 70 | 68 | 90 |
| YP | 165 | 210 | 93 | 135 | 160 |
| $\tau_0$ | 39.63 | 61.52 | 19.14 | 15.10 | 31.88 |

It also can be seen from Table 2 that 5 wt % more TEVS in formula #6 compared to that of formula #5 provides STH #6 with relatively high viscosity in both end of shear. In addition, the higher content of AM (50 wt %) in copolymers #1 and #2 endows the corresponding SafeTherms SHT #1 and STH #2 with higher viscosity compared to the rest of the samples containing lower content of AM (30 wt %). As seen in Table 4, the samples after 1 month aging maintain similar rheological profiles to those of 1 week aging with the exception of STH #6, which shows a rheological drop at both ends. This indicates that increasing TEVS in the copolymer does not improve its thermal stability although it increases the viscosity for the fresh sample.

TABLE 4

Rheology of samples after static aging at 250° F. for 1 month

| Fann 35 | STH#1 | STH#2 | STH#4 | STH#5 | STH#6 |
|---|---|---|---|---|---|
| 600 RPM | 430 | 435 | 252 | 273 | 276 |
| 300 RPM | 300 | 312 | 174 | 203 | 201 |
| 200 RPM | 250 | 255 | 139 | 172 | 162 |
| 100 RPM | 175 | 192 | 95 | 127 | 117 |
| 6 RPM | 65 | 84 | 35 | 47 | 45 |
| 3 RPM | 60 | 75 | 30 | 41 | 42 |
| PV | 130 | 123 | 78 | 70 | 75 |
| YP | 170 | 189 | 96 | 133 | 126 |
| $\tau_0$ | 42.94 | 59.25 | 20.73 | 18.28 | 23.48 |

Table 5 shows data of 2 months aging at 250° F. Compared to 1 month aging data, STH #1 shows about 10% rheology drop at both ends and measurements of the remaining samples were constant indicated by the similar rheology profiles shown in Tables 4 and 5. Comparing the compositions of copolymer #1 and #2 and aging profiles of STH #1 and STH #2, it can be concluded that the increase of organic crosslinker improves not only the rheology of the SafeTherm but also its thermal stability.

TABLE 5

Rheology of samples after static aging at 250° F. for 2 months

| Fann 35 | STH#1 | STH#2 | STH#4 | STH#5 | STH#6 |
|---|---|---|---|---|---|
| 600 RPM | 390 | 450 | 268 | 315 | 295 |
| 300 RPM | 270 | 321 | 182 | 231 | 212 |
| 200 RPM | 219 | 264 | 144 | 192 | 170 |
| 100 RPM | 153 | 195 | 98 | 141 | 119 |
| 6 RPM | 60 | 84 | 35 | 51 | 41 |
| 3 RPM | 54 | 75 | 30 | 45 | 39 |
| PV | 120 | 129 | 86 | 84 | 83 |
| YP | 150 | 192 | 96 | 147 | 129 |
| $\tau_0$ | 41.1 | 58.95 | 21.56 | 21.73 | 18.53 |

The static aging at 300° F. was also conducted for samples of STH #2, STH #5, and STH #6. The 2 weeks and 1 month aging data were listed in Tables 6 and 7, respectively. The aging data in both tables indicates that STH #5 maintains it thermal stability after 1 month aging at 300° F. However, the other two samples show thermal instable by indicating a drop in rheology from 2 weeks to 1 month aging although both samples show thermal stability after 2 months of aging at 250° F. Those aging results indicate that a 50 degree increase in temperature from 250 to 300° F. accelerates the hydrolysis of AM and AMPS and subsequently results in thermal instability.

TABLE 6

Rheology of sample after aging at 250° F.

| Fann 35 | 2 months | 4 months | 6 months | 8 months | 10 months |
|---|---|---|---|---|---|
| 600 RPM | 450 | 426 | 423 | 426 | 478 |
| 300 RPM | 321 | 300 | 297 | 300 | 339 |
| 100 RPM | 195 | 180 | 177 | 177 | 201 |
| 6 RPM | 84 | 78 | 75 | 75 | 81 |
| 3 RPM | 75 | 72 | 69 | 69 | 75 |
| PV | 129 | 126 | 126 | 126 | 139 |
| YP | 192 | 174 | 171 | 174 | 200 |
| $\tau_0$ | 58.95 | 58.87 | 55.67 | 54.60 | 55.11 |

The data of Table 6 further confirms the long term thermal performance and stability of the synthetic polymer discussed herein at a relatively high temperature (250° F.)

TABLE 7

Rheology of samples after static aging at 300° F. for 2 weeks

| Fann 35 | STH#2 | STH#5 | STH#6 |
|---|---|---|---|
| 600 RPM | 420 | 244 | 260 |
| 300 RPM | 303 | 176 | 175 |
| 200 RPM | 252 | 143 | 155 |
| 100 RPM | 186 | 102 | 110 |
| 6 RPM | 78 | 34 | 40 |
| 3 RPM | 72 | 30 | 35 |
| PV | 117 | 68 | 85 |
| YP | 186 | 108 | 90 |
| $\tau_0$ | 52.86 | 12.66 | 30.12 |

TABLE 8

Rheology of samples after static aging at 300° F. for 1 month

| Fann 35 | STH#2 | STH#5 | STH#6 |
|---|---|---|---|
| 600 RPM | 366 | 235 | 228 |
| 300 RPM | 252 | 169 | 157 |
| 200 RPM | 213 | 138 | 125 |
| 100 RPM | 153 | 98 | 85 |
| 6 RPM | 60 | 32 | 28 |
| 3 RPM | 54 | 28 | 26 |
| PV | 114 | 66 | 71 |
| YP | 138 | 103 | 86 |
| $\tau_0$ | 44.5 | 11.56 | 15.74 |

Comparing the aging data in Tables above, it can be concluded that the AM content in a copolymer should be controlled at 30 wt % or below to provide a more thermally stable copolymer.

Based on above aging results and conclusions, another set of copolymers with 30 wt % of AM was synthesized. The composition of the polymers was shown in Table 9 below. Formula #7 and #8 were chosen to see the effects of further increase of organic crosslinker on the thermal stability of polymers. #9 and #10 were synthesized to compare the effect of VP on thermal stability of the samples.

SafeTherms #7, #8, #9, and #10 were made with corresponding copolymers in Table 8 with the same formulation as shown previously. The static aging at 350° F. was conducted to have quick thermal stability analysis by accelerating the hydrolysis of AM and AMPS at a very high temperature. Tables 11 and 12 listed the rheology of a freshly prepared sample and a sample aged for 2 weeks at 350° F., respectively.

TABLE 9

Rheology of sample after static aging at 300° F. for several months 10 ppb polymer

| 1 month | 3 months | 5 months | 7 months |
|---|---|---|---|
| 558 | 510 | 492 | 519 |
| 418 | 369 | 345 | 357 |
| 345 | 306 | 282 | 291 |
| 252 | 225 | 201 | 210 |
| 102 | 90 | 81 | 78 |
| 93 | 84 | 75 | 72 |
| 140 | 141 | 149 | 162 |
| 278 | 228 | 198 | 195 |
| 45.13 | 54.43 | 56.94 | 55.31 |

The synthetic polymer which produced the above results was generated in a 12 ppg NaBr brine with a pH buffer and thermal extender. The polymer was subjected to yet higher temperatures below.

TABLE 10

Rheology of sample after static aging at 375° F. for several months

| Fann 35 | Fresh | 2 weeks | 2 months | 3.5 months |
|---|---|---|---|---|
| 600 RPM | 354 | 216 | 339 | 228 |
| 300 RPM | 228 | 162 | 228 | 153 |
| 200 RPM | 192 | 135 | 186 | 120 |
| 100 RPM | 147 | 99 | 135 | 81 |
| 6 RPM | 69 | 36 | 48 | 24 |
| 3 RPM | 63 | 30 | 42 | 21 |
| PV | 126 | 54 | 111 | 75 |
| YP | 10 | 108 | 117 | 78 |
| $\tau_0$ | 64.38 | 8.51 | 34.15 | 13.89 |

Table 10 depicts rheology data for a 9 ppb polymer synthesized in a Houston-based lab in 12 ppg brine (e.g., NaBr) in addition to a pH buffer and thermal extender. In contrast, Table 11 below provides rheological data for a 9 ppb polymer synthesized in a Cariant laboratory in 12 ppg brine (e.g., NaBr) in addition to a pH buffer and thermal extender.

TABLE 11

Rheology of sample after static aging at 400° F. at several weeks

| Fann 35 | Fresh | 2 weeks |
|---|---|---|
| 600 RPM | 276 | 234 |
| 300 RPM | 195 | 171 |
| 200 RPM | 159 | 141 |
| 100 RPM | 117 | 102 |
| 6 RPM | 48 | 36 |
| 3 RPM | 45 | 30 |
| PV | 81 | 63 |
| YP | 114 | 108 |
| $\tau_0$ | 34.63 | 12.58 |

TABLE 12

Formula of tetrapolymers

| Component | #7 | #8 | #9 | #10 |
|---|---|---|---|---|
| AM (wt %) | 30 | 30 | 30 | 30 |
| AMPS (wt %) | 40 | 40 | 45 | 35 |
| VP (wt %) | 20 | 20 | 20 | 30 |
| TEVS (wt %) | 10 | 10 | 5 | 5 |
| PAE (mol %) | 0.5 | 1.5 | 1.5 | 1.5 |

TABLE 13

Rheology of fresh samples

| Fann 35 | STH#7 | STH#8 | STH#9 | STH#10 |
|---|---|---|---|---|
| 600 RPM | 181 | 229 | 291 | 205 |
| 300 RPM | 122 | 176 | 228 | 160 |
| 200 RPM | 96 | 143 | 178 | 134 |
| 100 RPM | 66 | 108 | 150 | 104 |
| 6 RPM | 26 | 57 | 66 | 52 |
| 3 RPM | 23 | 55 | 63 | 50 |
| PV | 59 | 53 | 63 | 45 |
| YP | 63 | 123 | 165 | 115 |
| $\tau_0$ | 18 | 38.38 | 26.71 | 31.13 |

Comparing the rheology of STH #7 and STH #8, it can be seen that tripling the organic crosslinker in copolymer #8 increases the rheology of STH #8 at low shear dramatically. Replacing 10 wt % AMPS with VP decreases the viscosity of corresponding SafeTherms as seen in Table 13.

TABLE 14

Rheology of samples after static aging at 350° F. for 2 weeks

| Fann 35 | STH#7 |
|---|---|
| 600 RPM | 174 |
| 300 RPM | 117 |
| 200 RPM | 92 |
| 100 RPM | 62 |
| 6 RPM | 19 |
| 3 RPM | 16 |
| PV | 57 |
| YP | 60 |
| $\tau_0$ | 9.85 |

Comparing the rheological data of STH #7 in Tables 13 and 14, the high end rheology remains relatively constant before and after heat aging, but the rheology at low shear decreases by approximately 30%. However, the fluid maintains its integrity. This exhibits a promising result for the application of using the copolymer as high temperature fluid loss control additive in reservoir drill-in fluids (RDFs).

TABLE 15

Grace high temperature rheology of fresh STH#7

| | Pressure | | | | | |
|---|---|---|---|---|---|---|
| | 500 psi | 500 psi | 500 psi | 500 psi | 1000 psi | 1000 psi |
| Temperature | 120° F. | 150° F. | 200° F. | 250° F. | 300° F. | 350° F. |
| 600 RPM | 286.7 | 242.8 | 189.9 | 138.0 | 100.7 | 70.4 |
| 300 RPM | 179.8 | 150.6 | 117.6 | 89.9 | 69.1 | 48.3 |
| 200 RPM | 135.9 | 123.2 | 99.6 | 70.0 | 56.1 | 40.0 |
| 100 RPM | 92.8 | 88.44 | 71.2 | 60.8 | 45.8 | 28.4 |
| 6 RPM | 38.4 | 37.0 | 40.6 | 33.9 | 21.9 | 9.9 |
| 3 RPM | 32.2 | 31.4 | 29.4 | 24.5 | 15.8 | 7.6 |
| PV | 107 | 92 | 72 | 48 | 32 | 22 |
| YP | 73 | 58 | 45 | 42 | 38 | 27 |
| $\tau_0$ | 31.35 | 32.32 | 34.85 | 28.73 | 16.29 | 5.39 |

Table 15 provides rheological measurements at various temperatures of freshly prepared STH #7. The fluid shows positive rheological profiles for insulating packer fluid applications within a wide range of temperatures from 120 to 300° F. indicated by the slightly drop down of rheology at low shear with the increasing of temperature. Even at high temperatures up to 300° F., the 3 RPM reading is still maintained at 15.8 bl/100 ft². The rheological profile at 350° F. shows positive properties for RDF viscosifier and fluid loss control additive applications. Some of the RDF fluid loss test results support the positive performance of synthetic copolymers disclosed herein as compared to other commercially available polymers.

The packer fluids formulated in accordance with the present disclosure can be used as an insulating packer fluid for temperatures up to 525° F. or greater, providing a constant rheological profile even with prolonged heat aging and under high shear conditions. Further, the packer fluids disclosed herein may comprise organic-inorganic hybrid water soluble synthetic polymers with vinyl functional silane as an inorganic component, for example, synthesized by precipitation polymerization. It is believed that such polymers can viscosify the brine, providing a non-sticky structure which provides applications in both insulating packer fluid and drilling fluid.

TABLE 16

Formulation for insulating packer fluid

| 12.0 ppg NaBr | 315 ml |
|---|---|
| Ethylene glycol | 35 ml |
| Na2CO3 | 5 g |
| NaHCO3 | 10 g |
| Synthetic Polymer | 8 g |

Long term data in Table 17 below indicates a relatively flat rheology at 12 months aging, which may indicate thermal stability at temperatures of at least 300° F. for a year.

TABLE 17

| Long term aging data at 300° F. | | | | | | | |
|---|---|---|---|---|---|---|---|
| Fann 35 | 1 month | 3 month | 5 month | 7 month | 8.5 month | 11 month | 12 month |
| 600 RPM | 321 | 318 | 315 | 312 | 309 | 315 | 306 |
| 300 RPM | 243 | 231 | 225 | 219 | 213 | 210 | 201 |
| 200 RPM | 184 | 189 | 186 | 180 | 174 | 171 | 162 |
| 100 RPM | 153 | 141 | 135 | 129 | 126 | 120 | 114 |
| 6 RPM | 57 | 54 | 51 | 45 | 42 | 42 | 42 |
| 3 RPM | 51 | 45 | 45 | 39 | 36 | 36 | 36 |
| PV | 78 | 87 | 90 | 93 | 96 | 105 | 105 |
| YP | 165 | 144 | 135 | 126 | 110 | 105 | 96 |
| $\tau_0$ | 17.12 | 26.66 | 29.55 | 24.97 | 23.74 | 27.92 | 30.51 |

Synthetic polymers herein may be used as brine viscosifiers and/or a secondary fluid loss additives in reservoir drilling fluids (RDFs), such as in high temperature conditions.

RDF's herein may be produced using the formulations below by admixing an initial amount of brine (e.g., CaBr$_2$) and water, followed by shearing for approximately 2 minutes. Defoamer is added to the mixture, followed by shearing for approximately 2 minutes. Synthetic polymer disclosed herein is added to the mixture, followed by shearing for approximately 2 minutes. A pH buffer (e.g., magnesium oxide) is added, followed by shearing for approximately 5 minutes. A fluid loss additive is added, followed by shearing for approximately 2 minutes. DRISCAL® D is an example of an acrylamide (AM)/2-acrylamido-2-methylpropane sulfonic acid (AMPS) copolymer available from Drilling Specialties. Additional brine is added, followed by shearing for approximately 10 minutes. A bridging materials, such as sized calcium carbonate (e.g., SAFE-CARB™), for example is added, followed by shearing for approximately 10 minutes. The composition may be sheared by a Silverson mixer for approximately 3 minutes at 6000 rpm. Additional sized calcium carbonate is added, followed by mixing by a lab mixer for approximately 10 minutes. Rheological and fluid loss data is shown below in Tables 19.

TABLE 18

| Example formulations for synthetic polymer based RDF | |
|---|---|
| Water | 50 gm |
| Brine | 448.7 gm |
| Defoamer | 0.35 gm |
| Synthetic Polymer | 5 gm |
| MgO | 5 gm |
| Fluid loss additive | 5 gm |
| Sized calcium carbonate 2 | 40.5 gm |
| Sized calcium carbonate 10 | 18.9 gm |
| Sized calcium carbonate 20 | 14.6 gm |
| Brine | 0.293 bbls/bbl |
| Water | 0.143 bbls/bbl |
| Defoamer | 0.001 bbls/bbl |
| Synthetic Polymer | 4.0 lb/bbl |
| MgO | 5.0 lb/bbl |
| Fluid loss additive | 6.0 lb/bbl |
| Additional Brine | 0.465 bbls/bbl |
| Sized calcium carbonate 2 | 38.89 lb/bbl |
| Sized calcium carbonate 10 | 18.15 lb/bbl |

TABLEs 19

| Rheology @ 120° F. | Initial | After 16 hrs Hot Rolling at 356 F. |
|---|---|---|
| 600 | 128 | 143 |
| 300 | 78 | 90 |
| 200 | 59 | 69 |
| 100 | 37 | 45 |
| 6 | 6 | 12 |
| 3 | 4 | 9 |

The rheology shown indicates relative stability after hot rolling at 356° F. Fluid stability is shown following daily comparisons. Further, a reduction of fluid loss is shown below.

| Time, minutes | Fluid loss, mL |
|---|---|
| Spurt | 2 |
| 1 | 2.5 |
| 5 | 3.5 |
| 15 | 4.0 |
| 30 | 4.5 |
| 60 | 6.5 |
| 240 | 11.5 |
| 360 | 15.0 |

Table 20 provides additional data of fluids static aged at 356° F., of which the rheology was measured periodically at 120° F.

TABLE 20

| Rheology at 120° F. | | | |
|---|---|---|---|
| RPM | Initial | After 2 days | After 6 days |
| 600 | 141 | 132 | 111 |
| 300 | 89 | 80 | 66 |
| 200 | 67 | 60 | 49 |
| 100 | 41 | 38 | 30 |
| 6 | 8 | 8 | 6 |
| 3 | 6 | 6 | 4 |

To increase low end rheology of fluid statically aged for 6 days, the concentration of synthetic polymer was increased from 5 to 6 ppb to yield the rheology and low fluid loss data shown below.

TABLE 21

Fluid formulation with increased synthetic polymer concentration

| | |
|---|---|
| Water | 50 gm |
| Brine | 448.7 gm |
| Defoamer | 0.35 gm |
| Synthetic Polymer | 6 gm |
| MgO | 5 gm |
| Fluid loss additive | 4 gm |
| Sized calcium carbonate 2 | 40.5 gm |
| Sized calcium carbonate 10 | 18.9 gm |
| Sized calcium carbonate 20 | 14.6 gm |

TABLE 22

Rheology at 120° F. with increased synthetic polymer concentration

| | Initial | After 6 days |
|---|---|---|
| 600 | 175 | 154 |
| 300 | 113 | 87 |
| 200 | 86 | 63 |
| 100 | 55 | 39 |
| 6 | 12 | 10 |
| 3 | 9 | 8 |

TABLE 23

Fluid loss at 356° F. with increased synthetic polymer concentration

| Time, minutes | Fluid loss, mL |
|---|---|
| Spurt | 1.5 |
| 1 | 2.5 |
| 5 | 3.0 |
| 15 | |
| 30 | 5.0 |
| 60 | 6.5 |
| 240 | 12.0 |
| 300 | 13.5 |

Thus, materials disclosed herein have exhibit differing characteristics over insulating packer fluids that utilize organic compounds or polymers, which degrade at such extreme conditions and temperatures. The incorporation of inorganic components and/or other thermally stable additives to the synthetic polymer system may provide a water-based insulating packer fluid exhibiting relatively good yield stress ($\tau_o$ greater than 10 bl/100 ft$^2$) and relatively long-term stability at high temperatures (>200° F.). Particularly, the use of TEVS may increase thermal stability of wellbore fluids exhibiting a higher $\tau_o$ value as compared to fluids with a linear polymer. In addition, because the rheological profile of the fluids do not change appreciably with high heat or shear, the fluids may also be recaptured and reused for subsequent applications. Generally, fluids disclosed herein have applicability in various areas including, but not limited to, water-based drilling fluids, completion fluids, work-over fluids, reservoir drill-in fluids, fluid loss control pills and perforating fluids.

Fluids disclosed herein may comprise a base fluid, a copolymer, a thermal stabilizer, and a pH buffer. In other embodiments, fluids may comprise brine, a copolymer, a thermal stabilizer, a bridging material, and a fluid loss additive. It has been discovered that certain swellable polymers and/or copolymers may reduce or prevent fluid loss in oil field applications.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A method comprising:
   admixing a composition by:
      shearing a first mixture comprising water and a brine and adding a defoamer to the first mixture to form a second mixture;
      adding polymer to the second mixture and shearing to form a third mixture; and
      adding a pH buffer to the third mixture and shearing, wherein
         the polymer comprises a first monomer, a second monomer, a third monomer, an organic crosslinker, an inorganic crosslinker, and an initiator,
         the first monomer is acrylamide present in an amount from 30 to 50 wt. %, based on a total weight of the first monomer, the second monomer, the third monomer, and the inorganic crosslinker,
         the second monomer is 2-acrylamido-2-methyl-propane sulfonic acid present in an amount from 35 to 45 wt. %, based on the total weight of the first monomer, the second monomer, the third monomer, and the inorganic crosslinker,
         the third monomer is vinyl pyrrolidone present in an amount from 10 to 20 wt. %, based on the total weight of the first monomer, the second monomer, the third monomer, and the inorganic crosslinker,
         the organic crosslinker is pentaerythritol allyl ether present in an amount from 0.5 to 1.0 mol %, based on a total mole amount of the first monomer, the second monomer, and the third monomer,
         the inorganic crosslinker is triethoxyvinylsilane present in an amount from 5 to 10 wt %, based on the total weight of the first monomer, the second monomer, the third monomer, and the inorganic crosslinker,
         the polymer is present in the composition at a concentration from 8 to 10 ppb, and
         the pH buffer is present in the composition at a concentration of 15 ppb and comprises Na$_2$CO$_3$ and NaHCO$_3$;
   crosslinking the first monomer, the second monomer, and the third monomer to form a packer fluid; and
   preventing annular heat loss by pumping the formed packer fluid within at least one annular opening between a wellbore wall and a casing, between adjacent, concentric strings of pipe extending into a wellbore, or into a bore of a cased wellbore.

2. The method of claim 1, wherein the initiator is 2,2'-azobis(2-methylpropionitrile) or azobisisobutyronitrile.

3. A method comprising:
   admixing a composition by:
      shearing a first mixture comprising water and a brine and adding a defoamer to the first mixture to form a second mixture;
      adding polymer to the second mixture and shearing to form a third mixture; and
      adding a pH buffer to the third mixture and shearing, wherein
- the polymer comprises a first monomer, a second monomer, a third monomer, an organic crosslinker, an inorganic crosslinker, and an initiator,
- the first monomer is acrylamide present in an amount from 30 to 50 wt %, based on a total weight of the first monomer, the second monomer, the third monomer, and the inorganic crosslinker,
- the second monomer is vinyl pyrrolidone present in an amount from 10 to 20 wt %, based on the total weight of the first monomer, the second monomer, the third monomer, and the inorganic crosslinker,
- the third monomer is 2 acrylamido-2-methylpropanesulfonate present in an amount from 35 wt % to 45 wt %, based on the total weight of the first monomer, the second monomer, the third monomer, and the inorganic crosslinker,
- the organic crosslinker is pentaerythritol allyl ether present in an amount from 0.5 mol % to 1.0 mol %, based on a total mole amount of the first monomer, the second monomer, and the third monomer,
- the inorganic crosslinker is triethoxyvinylsilane present in an amount from 5 wt % to 10 wt %, based on the total weight of the first monomer, the second monomer, the third monomer, and the inorganic crosslinker,
- the polymer is present in the composition at a concentration from 8 to 10 ppb, and
- the pH buffer is present in the composition at a concentration of 15 ppb and comprises at $Na_2CO_3$ and $NaHCO_3$; and crosslinking the first monomer, the second monomer, and the third monomer to form a thermally stable fluid.

4. The method of claim 3, further comprising:
preventing annular heat loss by pumping the thermally stable fluid into at least one annular opening between a wellbore wall and a casing, between adjacent, concentric strings of pipe extending into a wellbore, or into a bore of a cased wellbore.

5. The method of claim 1, wherein the packer fluid has a yield stress greater than 10 lb/100 $ft^2$.

* * * * *